(12) United States Patent
Gable

(10) Patent No.: US 10,507,766 B1
(45) Date of Patent: Dec. 17, 2019

(54) VEHICLE OVERHEAD CLEARANCE DETECTOR

(71) Applicant: James Gable, Fort Worth, TX (US)

(72) Inventor: James Gable, Fort Worth, TX (US)

(*) Notice: Subject to any disclaimer, the term of this patent is extended or adjusted under 35 U.S.C. 154(b) by 0 days.

(21) Appl. No.: 15/428,795

(22) Filed: Feb. 9, 2017

(51) Int. Cl.
*B60Q 9/00* (2006.01)
*G01S 17/02* (2006.01)
*G01S 17/08* (2006.01)
*G01S 7/481* (2006.01)
*G01S 17/93* (2006.01)

(52) U.S. Cl.
CPC .......... *B60Q 9/008* (2013.01); *G01S 7/4813* (2013.01); *G01S 17/023* (2013.01); *G01S 17/08* (2013.01); *G01S 17/936* (2013.01)

(58) Field of Classification Search
CPC ..... B60Q 9/008; G01S 7/4813; G01S 17/023; G01S 17/08; G01S 17/936
See application file for complete search history.

(56) References Cited

U.S. PATENT DOCUMENTS

| | | |
|---|---|---|
| D341,787 S | 11/1993 | Chan |
| 5,389,912 A | 2/1995 | Arvin |
| 7,259,660 B2 | 8/2007 | Ewerhart et al. |
| 7,449,996 B2 | 11/2008 | Hill |
| 7,877,209 B2 | 1/2011 | Harris et al. |
| 8,212,660 B2 | 7/2012 | Nugent |
| 8,354,920 B2 | 1/2013 | Kole |

*Primary Examiner* — Orlando Bousono

(57) ABSTRACT

An vehicle overhead clearance detector devised to prevent a collision between an overhead obstruction and a vehicle and a cargo carrier attached to the vehicle by providing at least one sensor and a laser finding device operative to detect the overhead obstruction, a digital camera, and a visual flashing alarm disposed on a waterproof housing body disposed on a rotatable mounting base and in communication with a central processor unit operable by a driver. A monitor with integral speakers displays images captured by the digital camera to permit the driver to see any detected overhead obstructions. The housing body is disposed atop a motorized telescopic pole between a cab of a semi-tractor and a semi-trailer is operable via the central processor unit. The housing body is mounted atop the telescopic pole for proper positioning.

3 Claims, 5 Drawing Sheets

VEHICLE OVERHEAD CLEARANCE DETECTOR

BACKGROUND OF THE INVENTION

Cargo trucks and recreational vehicles with high vertical loads are subject to colliding with overhead obstructions, such as low clearance bridges and overpasses, overhanging signs, public parking structures, and tree branches, despite state and federal street and highway standards and vehicle height restrictions. Various types of vehicle collision warning systems utilizing ultrasonic acoustic or Doppler-mounting based radar systems to prevent such collisions are known in the prior art. These systems, however, are inept at detecting the potential for a collision between the rooftop of the vehicle and overhead obstructions. The present vehicle overhead clearance detector addresses the foregoing problem by including at least one sensor and a laser finding device operative to detect the overhead obstruction, a digital camera, and a visual flashing alarm disposed on a waterproof housing body disposed on a rotatable mounting base and in communication with a central processor unit operable by a driver. A monitor with integral speakers displays images captured by the digital camera to permit the driver to see any detected overhead obstructions. The housing body is disposed atop a motorized telescopic pole between a cab of a semi-tractor and a semi-trailer is operable via the central processor unit. The housing body is mounted atop the telescopic pole for proper positioning.

FIELD OF THE INVENTION

The present invention relates to collision avoidance systems, and more particularly, to a vehicle overhead clearance detector.

SUMMARY OF THE INVENTION

The general purpose of the present vehicle overhead clearance detector, described subsequently in greater detail, is to provide a vehicle overhead clearance detector which has many novel features that result in a vehicle overhead clearance detector which is not anticipated, rendered obvious, suggested, or even implied by prior art, either alone or in combination thereof.

To accomplish this, the present vehicle overhead clearance detector is devised to prevent a collision between an overhead obstruction and a vehicle and a cargo carrier attached to the vehicle. The vehicle overhead clearance detector includes a waterproof housing body disposed on a 360-degree rotatable mounting base.

At least one sensor is mounted within the housing body. The sensor is operative to measure the overhead distance between an overhead obstruction and the sensor itself. The sensor has a reference height above ground level at which the sensor is mounted on the vehicle within the housing body. A digital camera and a laser range finding device are also disposed on at least the front end of the housing body. The laser range finding device is a distance measurement sensor configured to use a narrowly focused infrared transmitter having a functional range for detecting objects at a distance in a range of 20 feet to 800 feet, which is necessary to provide sufficient braking distance to prevent a collision between the vehicle and the overhead obstruction. A visual flashing alarm is disposed on the housing body on the rear end. The rotatability of the mounting base permits the housing body to be rear facing for use of the sensor, the digital camera, and the laser range finding device in any direction relative the vehicle in such instances as backing up or turning the vehicle.

At least one central processor unit is in operational communication with the sensor, the digital camera, the laser range finding device, and the visual flashing alarm. The central processor unit is accessible and operable by a driver within a passenger compartment of the vehicle. The reference height of the sensor is entered into the central processor unit. A monitor with integral speakers, disposed within the passenger compartment of a vehicle, is in operational communication with the digital camera through the central processor unit. The monitor with integral speakers is configured to display the plurality of images captured by the digital camera to permit the driver to see any overhead obstructions detected by the sensor or the laser range finding device.

The housing body and the sensor within the housing body are disposed at a height above and in close proximity to a most elevated portion of a vehicle, which is one of a rooftop of a vehicle and an upper end of a load carried by the vehicle atop the rooftop and alternately in a cargo carrier attached to the vehicle. The height of the most elevated portion of the vehicle is entered into the central processor unit. The central processor unit is configured to add the reference height to the distance between the overhead obstruction and the sensor to determine a measured height of the overhead obstruction. The central processor unit activates the visual flashing alarm and activates an auditory alarm on the monitor with integral speakers if the measured height of the overhead obstruction is less than the height of the most elevated portion of the vehicle.

A motorized telescopic pole is disposed in a vertical position directly on the vehicle proximal a back side of the passenger compartment of the vehicle, such as between a cab of a semi-tractor and a semi-trailer. A motor is in operational communication with the telescopic pole and the central processor unit. The telescopic pole can, therefore, be extended and lowered via operation of the central processor unit. The housing body is mounted atop the telescopic pole which allows the housing body to be properly positioned relative the vehicle and the cargo carrier for efficient use of the sensor, the digital camera, and the laser range finding device.

Thus has been broadly outlined the more important features of the present vehicle overhead clearance detector so that the detailed description thereof that follows may be better understood and in order that the present contribution to the art may be better appreciated.

BRIEF DESCRIPTION OF THE DRAWINGS

Figures

DETAILED DESCRIPTION OF THE DRAWINGS

Figure 1:
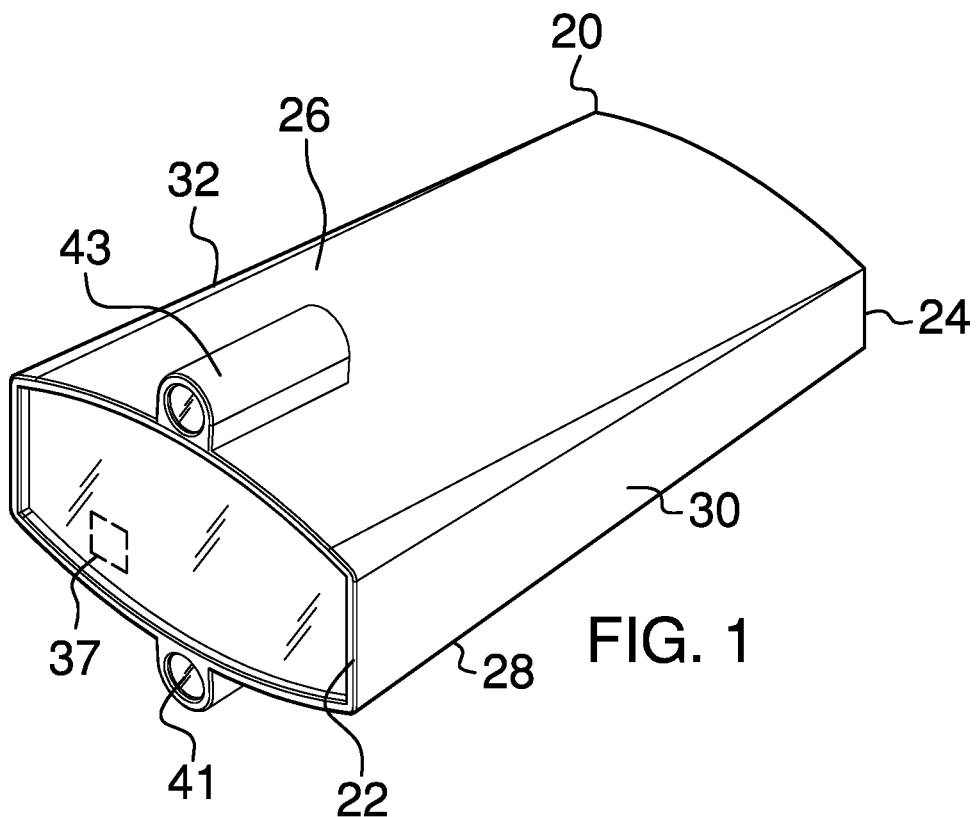
FIG. 1 is an isometric view of a housing body including a sensor, a digital camera, and a laser.
Figure 2:
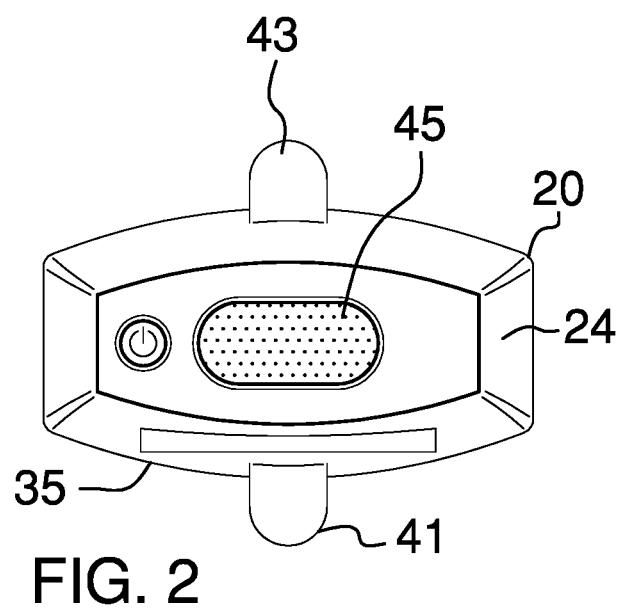
FIG. 2 is a rear elevation view.
Figure 3:
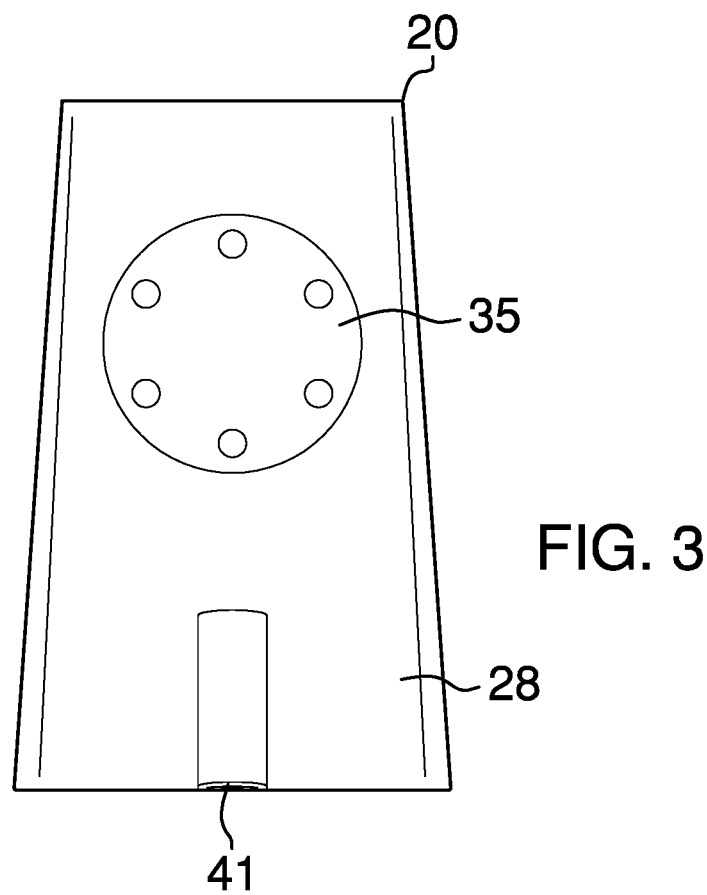
FIG. 3 is a bottom plan view.
Figure 4:
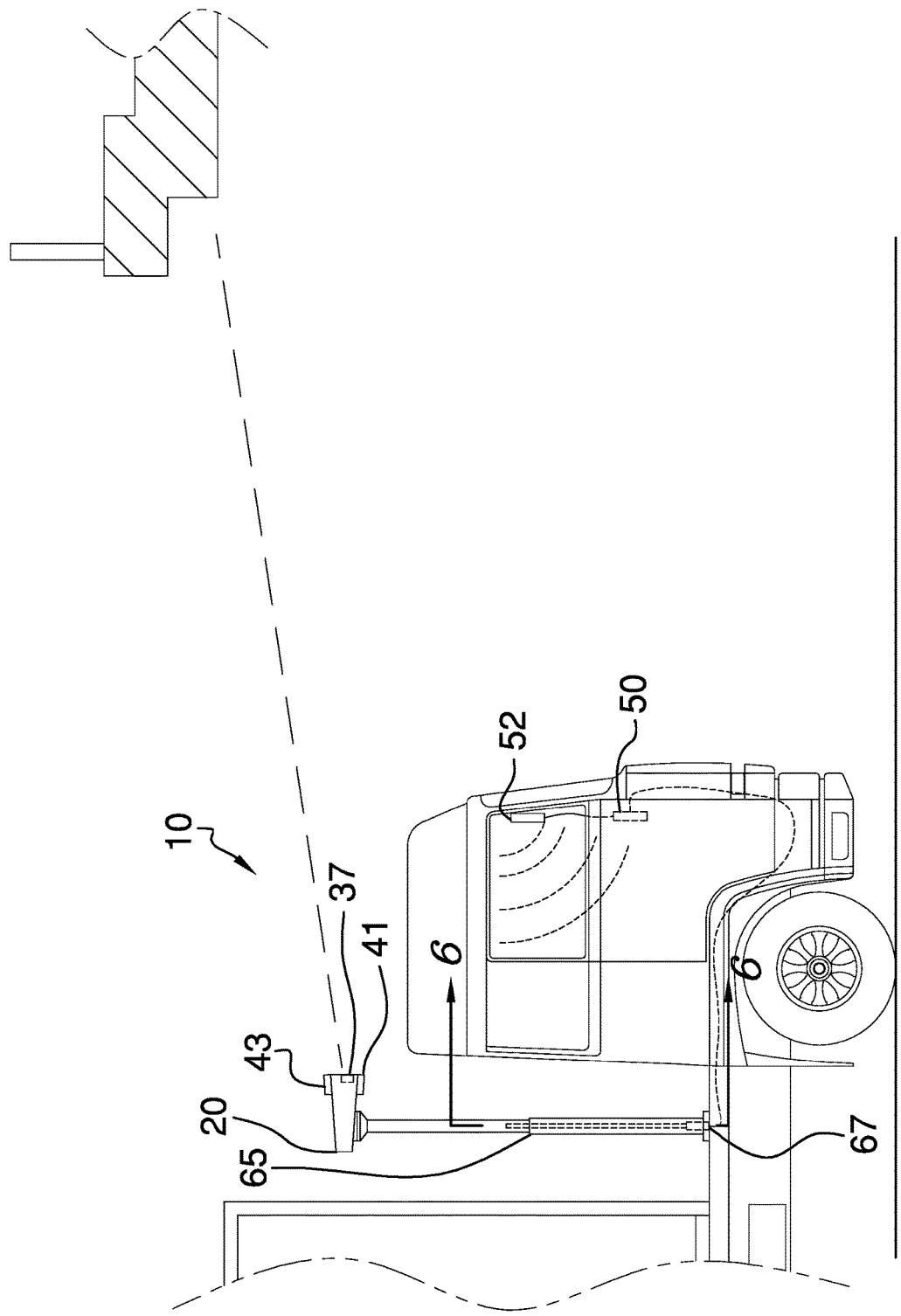
FIG. 4 is an in-use view mounted to motorized telescopic post in a position directly above the rooftop of a vehicle.
Figure 5:
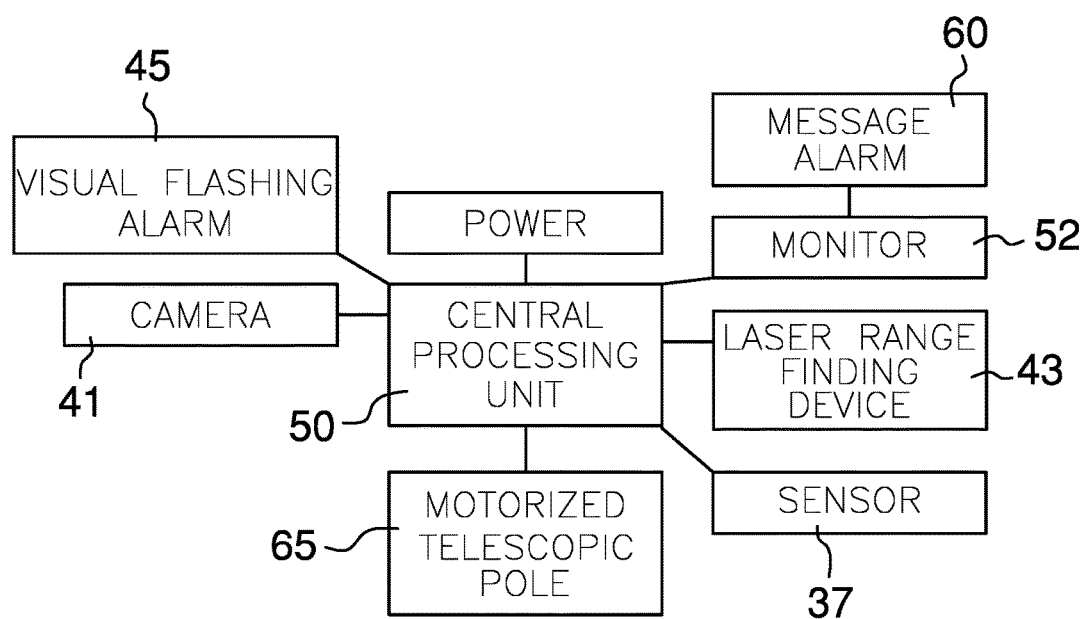
FIG. 5 is a block diagram of operations.
Figure 6:
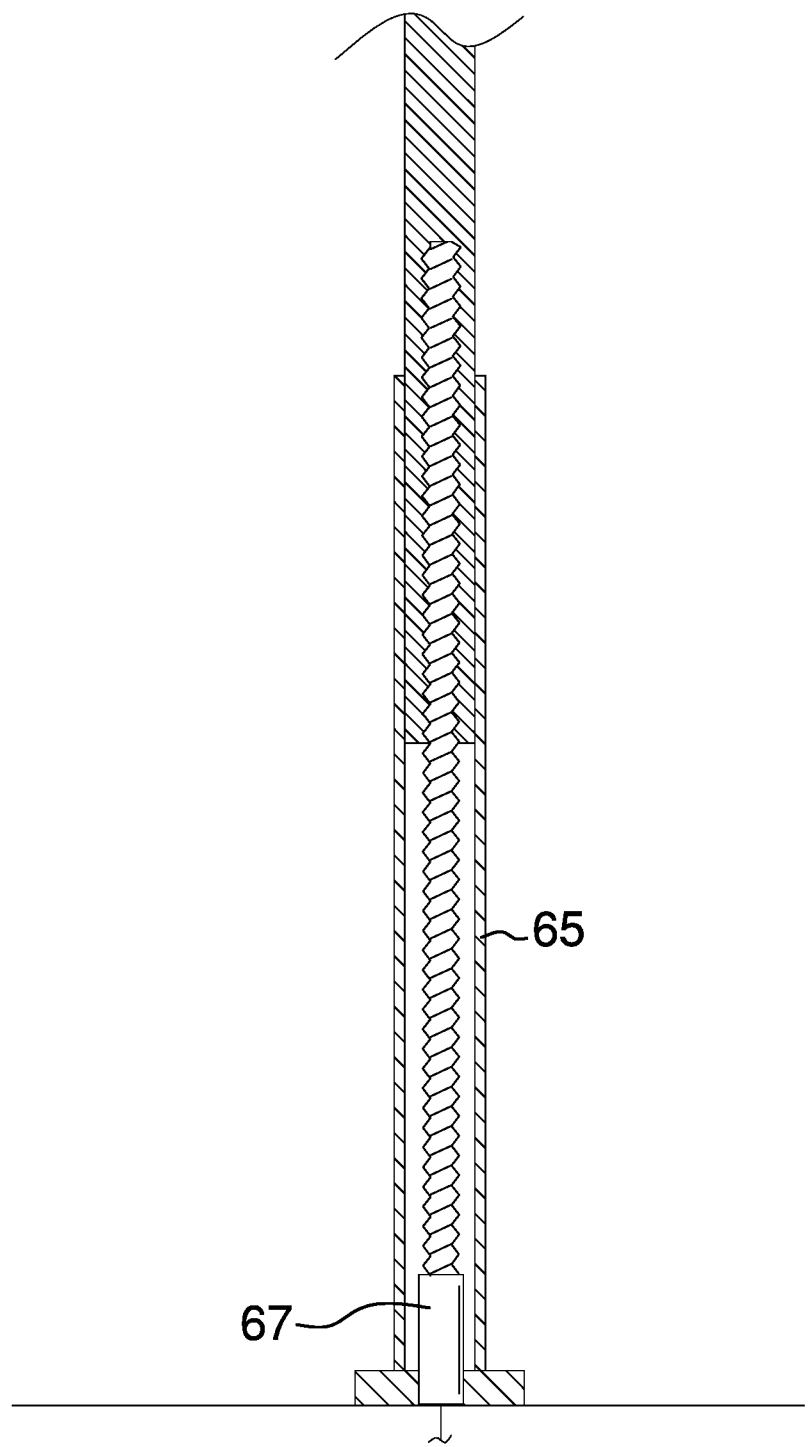
FIG. 6 is a cross-sectional view taken along line 6-6 of FIG. 4.

With reference now to the drawings, and in particular FIGS. 1 through 6 thereof, an example of the instant vehicle overhead clearance detector employing the principles and concepts of the present vehicle overhead clearance detector and generally designated by the reference number 10 will be described.

Referring to FIGS. 1 through 6, the present vehicle overhead clearance detector 10, devised to prevent a collision between an overhead obstruction and a vehicle and a cargo carrier attached to the vehicle, is illustrated. The vehicle overhead clearance detector 10 includes a waterproof housing body 20 having a front end 22 a rear end 24, a top side 26, a bottom side 28, a right side 30, and a left side 32. A rotatable mounting base 35 is centrally disposed on the bottom side 28 of the housing body 20. The mounting base 35 is rotatable 360 degrees.

At least one sensor 37 is mounted within the housing body 20. The sensor 37 is operative to measure the overhead distance between an overhead obstruction and the sensor 37 itself. The sensor 37 has a reference height above ground level at which the sensor 37 is mounted on the vehicle within the housing body 20. A framed transparent cover 38 is centrally disposed across the front end 22 in front of the sensor 37 to protect the sensor 37 from potential damage due to adverse environmental conditions. A digital camera 41 is also disposed on at least the front end 22 of the housing body 20 at the bottom side 28. The digital camera 41 is configured to capture and store a plurality of digital images. A laser range finding device 43 is additionally disposed on the housing body 20 on at least the front end 22 thereof at the top side 26. The laser range finding device 43 is a distance measurement sensor configured to use a narrowly focused infrared transmitter having a functional range for detecting objects at a distance in a range of 20 feet to 800 feet, which is necessary to provide sufficient braking distance to prevent a collision between the vehicle and the overhead obstruction. A visual flashing alarm 45 is disposed on the housing body 20 on the rear end 24.

At least one central processor unit 50 is in operational communication, which can be hard-wired or wireless, with the sensor 37, the digital camera 41, the laser range finding device 43, and the visual flashing alarm 45. The central processor unit 50 is accessible and operable by a driver within a passenger compartment of the vehicle. The reference height of the sensor 37 is entered into the central processor unit 50. A monitor with integral speakers 52, disposed within the passenger compartment of a vehicle, is in operational communication with the digital camera 41 through the central processor unit 50. The monitor with integral speakers 52 is configured to display the plurality of images captured by the digital camera 41 to permit the driver to see any overhead obstructions detected by the sensor 37 or the laser range finding device 43.

The housing body 20 and the sensor 37 within the housing body 20 are disposed at a height above and in close proximity to a most elevated portion of a vehicle, which is one of a rooftop of a vehicle and an upper end of a load carried by the vehicle atop the rooftop and alternately in a cargo carrier attached to the vehicle. The height of the most elevated portion of the vehicle is entered into the central processor unit 50. The central processor unit 50 is configured to add the reference height to the distance between the overhead obstruction and the sensor 37 to determine a measured height of the overhead obstruction. The central processor unit 50 activates the visual flashing alarm 45 and activates an auditory alarm 60 on the monitor with integral speakers 52 if the measured height of the overhead obstruction is less than the height of the most elevated portion of the vehicle.

A motorized telescopic pole 65 is disposed in a vertical position directly on the vehicle proximal a back side of the passenger compartment of the vehicle, such as between a cab of a semi-tractor and a semi-trailer. A motor 67 is in operational communication, either hard-wired or wireless, with the telescopic pole 65 and the central processor unit 50. The telescopic pole 65 can, therefore, be extended and lowered via the central processor unit 50. The housing body 20 is mounted atop the telescopic pole 65.

What is claimed is:

1. A vehicle overhead clearance detector comprising:
   a waterproof housing body having a front end, a rear end, a top side, a bottom side, a right side, and a left side;
   a rotatable mounting base centrally disposed on the bottom side of the housing body, the mounting base being rotatable 360 degrees;
   at least one sensor mounted within the housing body, wherein the sensor is operative to measure the overhead distance between an overhead obstruction and the sensor itself, the sensor having a reference height above ground level at which the sensor is mounted on a vehicle within the housing body;
   a framed transparent cover centrally disposed across the front end in front of the sensor;
   a digital camera disposed on at least the front end of the housing body at the bottom side, the digital camera being configured to capture and store a plurality of images;
   a laser range finding device disposed on the housing body on at least the front end thereof at the top side, wherein the laser range finding device is a distance measurement sensor configured to use a narrowly focused infrared transmitter having a functional range for detecting objects at a distance in a range of 20 feet to 800 feet;
   a visual flashing alarm disposed on the housing body;
   at least one central processor unit in operational communication with the sensor, the digital camera, the laser range finding device, and the visual flashing alarm, wherein the central processor unit is accessible and operable by a driver within a passenger compartment of the vehicle, wherein the reference height of the sensor is entered into the central processor unit;
   a monitor with integral speakers in operational communication with the digital camera through the central processor unit, the monitor with integral speakers being disposed within the passenger compartment of the vehicle, wherein the monitor with integral speakers is configured to display the plurality of images captured by the digital camera;
   wherein the housing body and the sensor mounted within the housing body are disposed at a height above and in close proximity to a most elevated portion of the vehicle, wherein the most elevated portion of the vehicle is one of a rooftop of the vehicle and an upper end of a load carried by the vehicle atop the rooftop and alternately in a cargo carrier attached to the vehicle;
   wherein the height of the most elevated portion of the vehicle is entered into the central processor unit;
   wherein the central processor unit is configured to add the reference height to the overhead distance between the overhead obstruction and the sensor to determine a measured height of the overhead obstruction;
   wherein the central processor unit activates the visual flashing alarm and activates an auditory alarm on the monitor with integral speakers if the measured height of the overhead obstruction is less than the height of the most elevated portion of the vehicle.

2. The vehicle overhead clearance detector of claim 1 comprising:
- a motorized telescopic pole disposed in a vertical position directly on the vehicle proximal a back side of the passenger compartment of the vehicle;
- a motor in operational communication with the telescopic pole and the central processor unit;
- the housing body mounted atop the telescopic pole.

3. The vehicle overhead clearance detector of claim 2 wherein the telescopic pole is disposed between a cab of the vehicle and the cargo carrier, wherein the cargo carrier is a semi-trailer connected to the cab.

\* \* \* \* \*